(12) United States Patent
Balay et al.

(10) Patent No.: US 12,398,590 B2
(45) Date of Patent: *Aug. 26, 2025

(54) CLEAR VIEW PANEL FOR OVERHEAD DOOR

(71) Applicant: CornellCookson, LLC., Mountain Top, PA (US)

(72) Inventors: Joseph L. Balay, Sugerload, PA (US); Thomas Balay, Drums, PA (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,470

(22) Filed: Jun. 3, 2024

(65) Prior Publication Data

US 2024/0344385 A1    Oct. 17, 2024

Related U.S. Application Data

(63) Continuation of application No. 18/188,705, filed on Mar. 23, 2023, now Pat. No. 12,000,202, and a
(Continued)

(51) Int. Cl.
*E06B 3/64* (2006.01)
*E06B 3/24* (2006.01)
(Continued)

(52) U.S. Cl.
CPC .................. *E06B 3/64* (2013.01); *E06B 3/24* (2013.01); *E06B 3/5821* (2013.01); *E06B 3/70* (2013.01); *E06B 2003/7044* (2013.01)

(58) Field of Classification Search
CPC .......... E06B 3/24; E06B 3/485; E06B 3/5821; E06B 3/64; E06B 3/70; E06B 2003/7044
See application file for complete search history.

(56) References Cited

U.S. PATENT DOCUMENTS 2,303,149 A * 11/1942 Verhagen .................. E06B 3/64
52/204.595
2,620,522 A * 12/1952 Fish .......................... E06B 3/64
52/204.595

(Continued)

FOREIGN PATENT DOCUMENTS

GB         504081 A *  4/1939
WO    2017136327 A1   8/2017
WO    2019204250 A1  10/2019

OTHER PUBLICATIONS

The International Search Report and The Written Opinion mailed in Corresponding No. PCT/US2021/53283 on Jan. 18, 2022, 7 pages.

*Primary Examiner* — Christine T Cajilig

(57) ABSTRACT

Examples of the present disclosure provide an overhead door panel. The overhead door panel includes a pair of parallel glass panes, a metal frame with parallel lateral stiles oriented perpendicular to the pair of parallel glass panes, a first seal system located at a first lateral stile, and a second seal system located at a second lateral stile, wherein the first seal system and the second seal system engage with at least one glass pane of the pair of parallel glass panes and a lateral stile of the parallel lateral stiles of the metal frame such that the first seal system and the second seal system are between the at least one glass pane and the lateral stile.

19 Claims, 3 Drawing Sheets

Related U.S. Application Data continuation of application No. 17/492,652, filed on Oct. 3, 2021, now Pat. No. 11,624,232.

(60) Provisional application No. 63/087,247, filed on Oct. 4, 2020.

(51) Int. Cl.
*E06B 3/58* (2006.01)
*E06B 3/70* (2006.01)

(56) References Cited

U.S. PATENT DOCUMENTS

| | | | |
|---|---|---|---|
| 2,892,496 A * | 6/1959 | Stroup | E06B 3/485 |
| | | | 52/207 |
| 4,294,055 A | 10/1981 | Andresen | |
| 4,563,843 A * | 1/1986 | Grether | E06B 3/6715 |
| | | | 52/786.13 |
| 4,567,703 A | 2/1986 | Ricks | |
| 4,944,118 A | 7/1990 | Biro | |
| 5,168,915 A * | 12/1992 | Lafleur | E06B 3/66361 |
| | | | 160/236 |
| 7,296,608 B2 | 11/2007 | Weishar et al. | |
| 8,733,024 B2 | 5/2014 | Vogel et al. | |
| 8,869,450 B2 | 10/2014 | Balay et al. | |
| 10,125,540 B2 | 11/2018 | Femont et al. | |
| 2003/0072899 A1 | 4/2003 | Compton et al. | |
| 2004/0172882 A1 | 9/2004 | Kern et al. | |
| 2014/0326126 A1* | 11/2014 | Hay, III | E06B 5/10 |
| | | | 89/36.04 |
| 2015/0218876 A1 | 8/2015 | Miller et al. | |

* cited by examiner

CLEAR VIEW PANEL FOR OVERHEAD DOOR

CROSS REFERENCE TO RELATED APPLICATIONS

This application claims the priority of U.S. patent application Ser. No. 18/188,705, filed on Mar. 23, 2023, now U.S. Pat. No. 12,000,202, which is a continuation of U.S. patent application Ser. No. 17/492,652, filed on Oct. 3, 2021, now U.S. Pat. No. 11,624,232, which claims the benefit of U.S. Provisional Patent Application Ser. No. 63/087,247, filed Oct. 4, 2020, all of which are herein incorporated by reference in their entirety.

BACKGROUND

Overhead doors are utilized to provide security and access control in institutional, industrial and commercial buildings. They fall into two general design categories: coiling doors and segmented panel doors. Each have their advantages and disadvantages making one better suited for a given design application.

Often times a segmented panel door is better suited for a particular application. Various panel designs have been used to provide an acceptable thermal barrier. These include, for example, solid wood panels and panels comprising metal or fiberglass, optionally with inner and outer layers sandwiching an insulating material there between.

There are applications that use a transparent or translucent glass overhead door panels in an overhead door. However, the materials used in such transparent or translucent panel are very poor insulators for temperature. Traditionally, to achieve acceptable thermal barrier properties insulated glass is utilized. Insulated glass (IG) uses double panes of glass separated by a vacuum or gas filled space to reduce heat transfer through the panel.

The glass panes are separated by a "spacer." A spacer, also known as a warm edge, is the piece that separates the two panes of glass and seals the gas space between them. Historically, spacers were made primarily of metal and fiber which were thought to provide increased durability.

However, unless the metal is thermally improved, metal spacers are likewise, relatively poor insulators, and undermine the ability of the insulated glass overhead door panel to reduce heat transfer through the insulated glass portions of the panel. Water or ice may form at the bottom of the glass panel because of the sharp temperature difference between the insulated glass portion of the overhead door panels and surrounding air. To reduce heat transfer through the spacer of the glass overhead door panel and to increase overall thermal performance of the overhead door, the spacer may be made out of a less-conductive material such as structural foam. A spacer made of aluminum that also contains a highly structural thermal barrier also reduces condensation on the glass surface and improves insulation, as measured by the overall U-value.

Typically, spacers are filled with, or contain, desiccant to remove moisture trapped in the gas cavity during manufacturing, thereby lowering the dew point of the gas in the gas cavity and preventing condensation from forming when the outside glass overhead door panel temperature is different from the temperature of the gas cavity.

In constructing the traditional IG panel, spacers of a specific thicknesses are cut and assembled into the required overall width and height dimensions. The spacers are then filled with desiccant. An adhesive sealant is applied to the face of the spacer on each side and the glass panes are pressed against the spacer. Two holes are drilled into the spacer of the assembled unit and the air is drawn out of the space leaving a vacuum. If the unit is to be gas filled, the removed air is replaced with gas, typically an inert gas. The holes are then sealed. Alternately, an online gas filler is used eliminating the need to drill holes in the spacer.

The units are then sealed on the edge to prevent humid outside air from entering the unit. The desiccant will remove traces of humidity from the air space to prevent condensation from appearing on the inside faces of the glass panes (inside the gas cavity) during cold weather.

However, IG units are known for eventual problems of the seals breaking down and allowing the gases to escape from the gas cavity, which are replaced by the air and water vapor. Condensation of the water vapor then builds up in the gas cavity between the glass panes due to thermal expansion differences between the inside and outside glass panes, constantly working on the seals, known as solar pumping.

DETAILED DESCRIPTION

Examples described herein provide examples of a clear view panel for overhead doors. The frame for such clear view panels are formed from horizontal structures that are the upper and lower edges of an overhead door panel that mate to an adjacent overhead door panel to form a continuous door structure when the door is in a closed position. The vertical stile structures separate one piece of glass from an adjacent piece of glass or form the end of an overhead door panel.

As noted above, a difficulty with current IG units is the manufacturing complexity of replacing air with a gas in between the two panes of glass material. This is further complicated when the glass "frame" is exposed to external elements such as an overhead door panel. There is also the resulting issues of solar pumping and thermal bowing of IG units.

As further discussed herein, the issue of solar pumping and thermal bowing is addressed in the present disclosure by allowing the inside and outside faces to have independent seals allowing the seals to thermally expand at different rates relative to each other. In another example, a vapor permeable membrane may be used as part of the overhead door panel frame to allow the air between the panes to release pressure through, while preventing the introduction of water, water vapor, or any other forms of moisture from entering into the cavity between the glass panels. This is accomplished while providing a suitable U-factor.

"Glass" as used herein may refer to glass, glazing, laminated glass, polycarbonate, polymethylmethacrylate (PMMA), and other similar materials that may be transparent, translucent, tinted, colored, textured, or any other modifications that allow for light to transfer through the thickness thereof.

Figure 1:
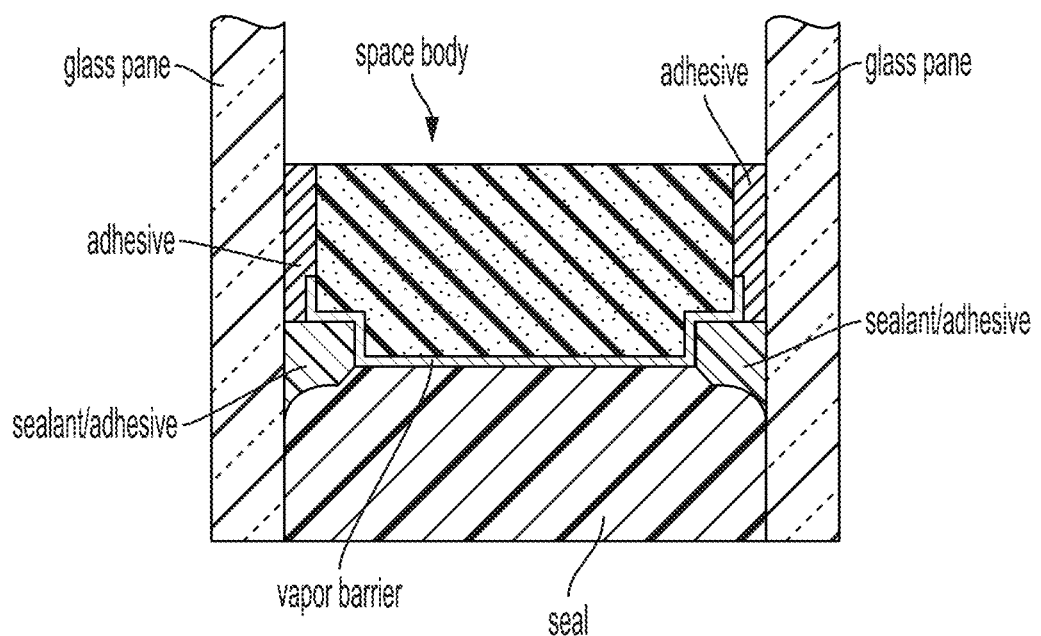
FIG. 1 is an example of a prior art insulated glass spacer.

FIG. 1 illustrates a cross-sectional view of a traditional spacer for insulated glass that is present about the perimeter of an IG unit and between the two parallel glass panes. The cross-sectional view shows spacer assembly between two parallel glass panes with the upper portion of the spacer being oriented towards the center of the IG unit and the lower portion of the spacer being oriented towards the edges of the IG unit. In an example, the traditional spacer may include a spacer body, a sealant, a desiccant, a moisture vapor barrier, and a secondary sealant.

In one embodiment, the present disclosure provides an overhead door panel with a glass section that has a structure that provides for it to be independent as a panel and able to interact with adjacent panels to form the overhead panel door. The external facing portion of overhead door panels is exposed to exterior elements such as precipitation, wind, sunlight, as well as interior elements. However, an overhead door is designed to be a structure that moves and changes positions. As such, an overhead door panel with window sections not only needs to perform as a section that can be seen through, it must also be able to perform in multiple orientations (e.g., open door, closed door, door moving from open/closed), and providing insulation properties between the exterior environment and the interior environment.

In the present disclosure, the use of independent seals, and/or optionally vapor permeable membranes, allows for a desired U-factor while still allowing the user to experience an un-obscured view of the exterior. U-value measures the rate of heat transfer, and is appropriately applied to the thermal efficiency of windows or doors which are assemblies comprised of multiple components. U-value is an independently tested value and distinct from R-values.

R-value is another known value reported for thermal properties and is the inverse of the time rate of heat flow through a body from one of its bounding surfaces to the other surface for a unit temperature difference between the two surfaces, under steady state conditions, per unit area. The higher the R-Value, the greater the insulation power for an individual material or component, not for the entire overhead door. As discussed in further details below, the present disclosure allows the interior face of the overhead door panel and exterior face to shrink or expand based on the temperature differential between them. The structure discussed isolates the difference by having a larger separation between the interior face and the exterior face allowing the temperature differential to lessen. The reduction in temperature differential reduces the stress applied to the interior and exterior surfaces of the overhead door panel, which also provides the freedom of the interior surface to move independently of the exterior surface to reduce or eliminate the thermal bow effect for the overhead door panel.

It is desired to have a flush exterior for the overhead door such that the overhead door panels are aligned, which creates an exterior gasket engagement. The door panel may have a predetermined thickness, such as approximately 2 inches. In one embodiment, no gases (inert gases) or desiccant is included in the thickness of the panels. In one embodiment, a vapor permeable membrane on the end stile of the panel is selected to allow one-way moisture transportation.

Figure 2:
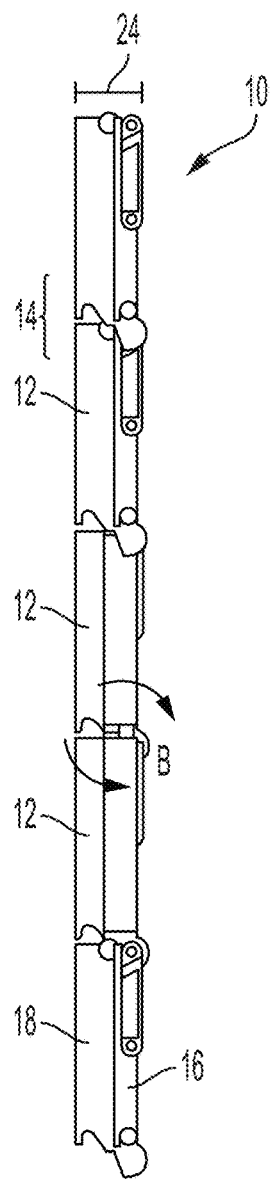
FIG. 2 is an end view of an example overhead door of the present disclosure in a closed position.

FIG. 2 illustrates an end view of an overhead door 10 comprising multiple overhead door panels 12 (also referred to herein as panels 12). The overhead door 10 is shown in the "down" or "closed" position, where each overhead door panel 12 is pivotally attached to the adjacent panels above or below, generally by a hinge means 14. The hinge means 14 may provide a permanent hinge connection between the panels 12 (e.g., via a fastener, screw, bolt, and the like) or a temporary connection between the panels 12 (e.g., via a mechanical hook or latch that can be separated). Area B shows the interaction between a first door panel and a second door panel that is further shown in FIG. 3. The overhead door 10 has an exterior surface 16 and an interior surface 18.

In one embodiment, an individual overhead door panel 12 has a generally rectangular shape, having a greater width than height, and a thickness 24 between 0.25 inches and 5 inches. The generally rectangular shape comprises a top horizontal stile, a bottom horizontal stile, a left vertical stile, and a right vertical stile. The overhead door panel 12 may comprise one or more middle vertical stiles. For "full view" overhead door panels 12, there are no middle vertical stiles. In other words, the generally rectangular shape may comprise parallel lateral edges that are oriented perpendicular to the pair of parallel glass panes.

Figure 3:
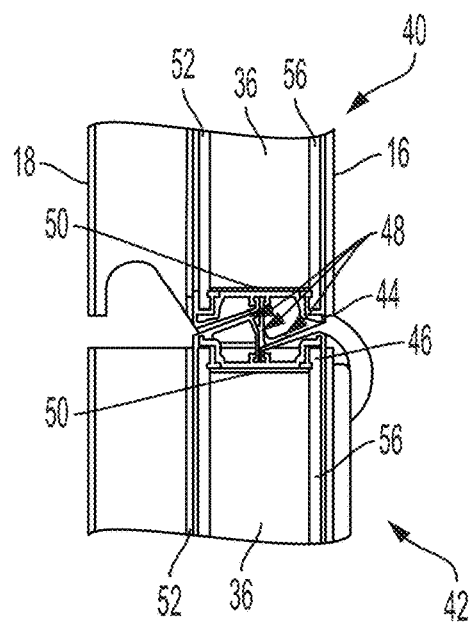
FIG. 3 is a cross-sectional view of an example seal system between a first and second overhead door panels.
Figure 4:
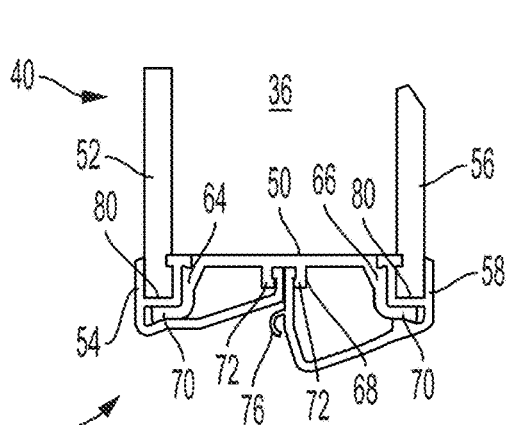
FIG. 4 is an enlarged view of an example seal system on a first overhead door panel of the present disclosure.
Figure 5:
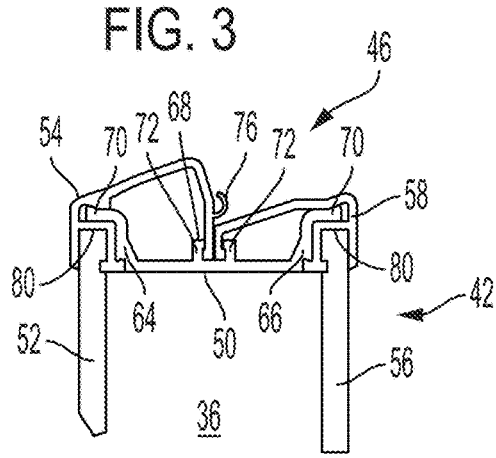
FIG. 5 is an enlarged view of an example seal system on a second overhead door panel of the present disclosure.

FIG. 3 illustrates a cross-sectional view of two adjacent panels 12, each panel 12 with a glass section 36. FIG. 3 may illustrate a magnified view of Area B of FIG. 2. The glass section 36 is held within the generally rectangular shape of the overhead door panel 12. The glass section 36 may include a pair of parallel glass panes, as illustrated in FIGS. 4 and 5 and discussed below.

A first overhead door panel 40 may pivotally connect to at least a second overhead door panel 42. The pivotal connection may be permanent, such as through a hinge, or the pivotal connection may allow for the adjacent panels to be completely separable and independent. The pivotal connection may be in the panel area corresponding to the top horizontal stile or the bottom horizontal stile and may comprise a plurality of metal hinges providing a pivotal connection between panels.

Figures 7, 8:
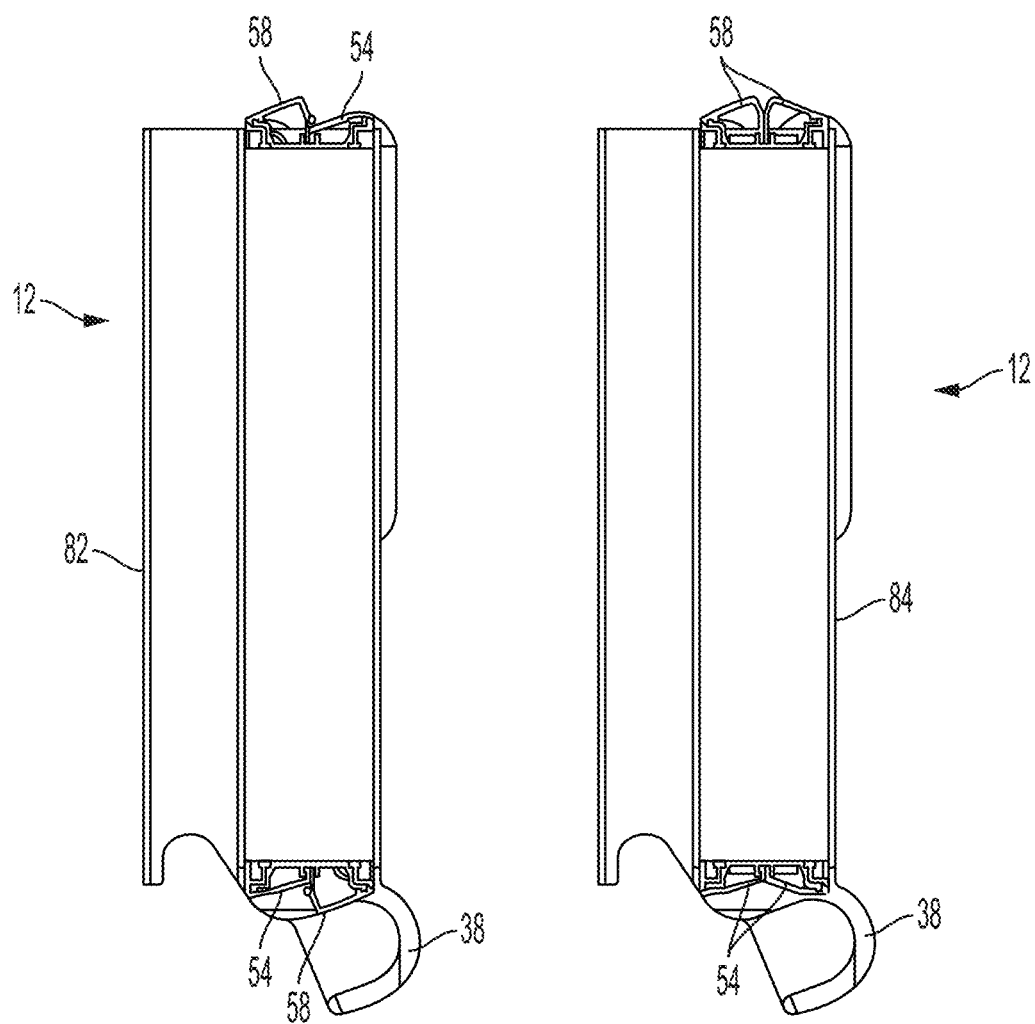
FIG. 7 is a cross-sectional view of an example overhead door panel with an alternate embodiment of the seal system of the present disclosure.
FIG. 8 is a cross-sectional view of an example overhead door panel with an alternative embodiment of the seal system of the present disclosure.

Alternatively, the pivotal connection may be a temporary connection which occurs when the door is moving from an open position into a closed position and when the door is in a closed position (but not in an open position). An example of the pivotal connection which is a temporary connection between panels is illustrated in FIGS. 7 and 8. The pivotal connection may be in relation or oriented to the right and left vertical stile areas of the overhead door panel 12.

The structure of the overhead door panel 12 may comprise an exterior surface 16 and an interior surface 18, as noted above. The overhead door may comprise at least two overhead door panels 12 further comprising the glass section 36 with the pivotal connection in relation to the right and left vertical stiles.

As noted above, FIG. 3 illustrates adjacent overhead door panels along the bottom horizontal stile of the first overhead door panel 40 and the top horizontal stile of the second overhead door panel 42. The stiles will comprise the approximate width of the panel and between 1-7 inches in height of the panel, such as between 1-4 inches. The stiles provide a rectangular frame for the glass sections of the panel. The surface of the bottom horizontal stile, or first lateral edge, further comprises a first seal system 44 that is adjacent and engages with the surface of the adjacent second overhead door panel 42. The top horizontal stile, or a second lateral edge, of the second overhead door panel 42 comprises a second seal system 46 that is adjacent and engages with the surface of the adjacent first overhead door panel 40. In other words, the first seal system 44 may be located on the first lateral edge and the second seal system 46 may be located on a second lateral edge.

In one embodiment, the first seal system 44 and the second seal system 46 provide an engagement surface 48 and sealing properties between the first overhead door panel 40 and the second overhead door panel 42. The engagement may not be permanent (i.e., temporary or can be disengaged) so that the first overhead door panel 40 and the second overhead door panel 42 may be engaged when the door is in a closed ("down") position, disengaged when traveling between an open ("up") or closed position, or potentially disengaged or engaged when in an open position.

FIG. 4 illustrates the cross-sectional view of the first overhead door panel 40 of FIG. 3. The glass section 36 comprises two panes of glass that are spatially separated by a central extrusion 50.

In one embodiment, the central extrusion 50 may be connected to a first glass pane 52 by a first polymer extrusion 54 and a second glass pane 56 by a second polymer extrusion 58. The first polymer extrusion 54 and the second polymer extrusion 58 may be engaged with each other to form the first seal system 44. In one embodiment, the first glass pane 52 may be on an interior side or internal and the second glass plane 56 may be on an exterior side or external.

In one embodiment, the connection of the first polymer extrusion 54 to the first glass pane 52 may be achieved through the use of a suitable adhesive. The connection of the second polymer extrusion 58 to the second glass pane 56 may be achieved through the use of a suitable adhesive. The engagement between the first polymer extrusion 54 and the second polymer extrusion 58 is preferably without the use of a fastener or adhesive.

In one embodiment, the central extrusion 50 may be a metal frame section. For example, the metal frame section may be an aluminum extrusion. The aluminum extrusion may comprise a cross-section profile that comprises a generally planar structure having an upper side and a lower side, with a first engagement structure 64, a second engagement structure 66, a third engagement structure 68 all extending from either the upper side or all extending from the lower side of the central extrusion 50.

The first engagement structure 64 and the second engagement structure 66 may extend from the generally planar structure of the central extrusion 50 in a generally perpendicular direction for a distance. The first engagement structure 64 and the second engagement structure 66 may have a ledge structure 70 parallel to the general planar structure. The ledge structure 70 may be orientated to be away from the third engagement structure 68.

The third engagement structure 68 comprises a pair of spatially distanced extensions 72 capable of engaging with and holding the first polymer extrusion 54 and the second polymer extrusion 58. The extensions 72 may each have an "L" shape. For example, a lip of the extension 72 may have a smaller opening than an opening below the lip of the extension 72. As used herein "holding" means touching and providing structure support including friction fit, securing, immobilizing or other interactions with the door panel or other components (e.g., window).

The first polymer extrusion 54 comprises a cross-section profile that engages with an edge of the first glass pane 52 and with the first engagement structure 64, forming an internal connection and seal between the first glass pane 52 and the first polymer extrusion 54. As used herein the "edge" of a glass pane is the narrow dimension, or thickness, of a pane of glass whether it is a vertical or horizontal edge. The larger dimension is referenced to be the internal pane or external pane. The first polymer extrusion 54 further comprises an engagement plane that terminates within the third engagement structure.

The second polymer extrusion 58 comprises a cross-section profile that engages with an edge of the second glass pane 56 and with the second engagement structure 66, forming an internal connection and seal between the second glass pane 56 and the second polymer extrusion 58. The second polymer extrusion 58 further comprises an engagement plane that terminates within the third engagement structure 68. The profile of the second polymer extrusion 58 may further comprise a seal structure 76 that extends from the surface of the second polymer extrusion 58. The seal structure 76 may be adjacent to and contact a similar seal structure 76 located on an adjacent overhead door panel seal system, e.g., the second overhead door panel 44 illustrated in FIG. 5.

The seal structure 76 is illustrated as having a "C" shaped or curved cross-section in FIGS. 4 and 5. However, it should be noted that the seal structure 76 may have any shape that allows the first seal system 44 to interconnect with the second seal system 46 to form a seal.

The first seal system 44 comprising the first polymer extrusion 54 and the second polymer extrusion 58 may be used at the bottom horizontal stile area of the second overhead door panel 44 shown in FIG. 5. The cross-sectional profile of the first polymer extrusion 54 may be the same or different from the cross-sectional profile of the second polymer extrusion 58. The engagement planes of the first polymer extrusion 54 and the second polymer extrusion 58 are intended to engage with the top horizontal stile of the adjacent second overhead door panel 44 and a corresponding engagement plane of the second seal system 46 of the second overhead door panel 44.

The top horizontal stile of an overhead door panel 12 further comprises the second seal system 46. The second seal system 46 may be the same as the first seal system 44 located at the bottom horizontal stile of the first overhead door panel 40 as shown in FIGS. 2 and 5.

FIG. 5 illustrates an enlarged view of the second seal system 46 on the second overhead door panel 42. In one embodiment, a first glass pane 52 and a second glass pane 56 are spatially separated by a central extrusion 50. In other words, the spatial separation may be created by the first seal system 44 and the second seal system 46. The central extrusion 50 may be fabricated from aluminum and also be referred to as a central aluminum extrusion 50.

In one embodiment, the central aluminum extrusion 50 may be connected to the first glass pane 52 by a first polymer extrusion 54 and the second glass pane 56 by a second polymer extrusion 58. The first polymer extrusion 54 and the second polymer extrusion 58 may be engaged with each other to form the second seal system 46.

In one embodiment, the first polymer extrusion 54 and the second polymer extrusion 58 may comprise thermoplastics such as polyvinylchloride (PVC), chlorinated polyvinylchloride (CPVC), EVA, thermosetting materials such as ethylene propylene diene monomer (EPDM), and modified EPDM, elastomers, such as a silicone, nitrile, polyurethane, styrene-butadiene, and combinations thereof. The resulting structure of the first polymer extrusion 54 or the second polymer extrusion 58 may be solid, foamed, cellular, or a sponge construction, respectively. The first polymer extrusion 54 and the second polymer extrusion 58 profile may further comprise plasticizers, viscosity modifiers such as processing oils or esters, fillers, colorants, curing agents, antioxidants and other additives.

The connection of the first polymer extrusion 54 to the first glass pane 52 may be achieved through the use of a suitable adhesive. The connection of the second polymer extrusion 58 to the second glass pane 56 may be achieved through the use of a suitable adhesive. The engagement between the first polymer extrusion 54 and second polymer extrusion 58 is preferably without the use of a fastener or adhesive.

The central extrusion 50 may comprise a cross-section profile that comprises a generally planar structure having an upper side and a lower side, with a first engagement structure 64, a second engagement structure 66, and a third engagement structure 68 all extending from either the upper side or all extending from the lower side. The first engagement structure 64 and the second engagement structure 66 may extend from the generally planar structure in a generally perpendicular direction for a distance. The first engagement structure 64 and the second engagement structure 66 may have a ledge structure 70 parallel to the general planar structure. The ledge structure 70 is orientated to be away from the third engagement structure 68 and is adjacent to, but separated from, the edge of the first glass pane 52 and the second glass plane 56. The separation is provided by the first polymer extrusion 54 and the second polymer extrusion 58.

In one embodiment, the third engagement structure 68 comprises a pair of spatially distanced extensions 72 capable of engaging with and holding the first polymer extrusion 54 and the second polymer extrusion 58. For example, portions of the first polymer extrusion 54 and the second polymer extrusion 58 may be fit side-by-side or adjacent to one another between the spatially distanced extensions 72 of the third engagement structure 68. The first polymer extrusion 54 comprises a cross-section profile that comprises a glass run channel 80 which engages with the edge of the first glass pane 52 and with the ledge structure 70 of the first engagement structure 64 of the central extrusion 50, forming an internal connection and seal between the first glass pane 52 and the first polymer extrusion 54. The first polymer extrusion 54 further comprises an engagement plane that terminates within the third engagement structure 68.

The first polymer extrusion 54 further comprises an engagement plane that terminates within the third engagement structure 68. The cross-sectional profile of the first polymer extrusion 54 may further comprise a seal structure 76 that extends from the surface of the first polymer extrusion 54. The seal structure 76 may be adjacent to and contact a similar seal structure 76 located on an adjacent overhead door panel seal system, e.g., as shown in FIG. 3.

The second polymer extrusion 58 comprises a cross-section profile that comprises a glass run channel 80 which engages with the ledge structure 70 of the second engagement structure 68 of the central extrusion 50, forming an internal connection and seal between the first glass pane and the first polymer extrusion.

In one embodiment, the first seal system 44 and the second seal system 46 comprise a first polymer extrusion 54 with a first profile that is different from the second polymer extrusion 58 with a second profile, but the first seal system 44 and the second seal system 46 each comprise one first polymer extrusion 54 and one second polymer extrusion 58. An example of the overhead door panel 12 with two different extrusion profiles is illustrated in FIG. 7.

The connection of the first polymer extrusion 54 is on the interior pane 82 when located on the bottom horizontal stile and on the exterior pane 84 when located on the top horizontal stile. The connection of the second polymer extrusion 58 is on the exterior pane 84 when located on the bottom horizontal stile and on the interior pane 82 when located on the top horizontal stile. The profile of the first polymer extrusion 54 is different from the profile of the second polymer extrusion 58. The second polymer extrusion 58 optionally comprises a seal structure 76. FIG. 7 also illustrates an example of the pivotal connection 38 discussed above.

In one embodiment the first seal system 44 and the second seal system 46 comprise either two first polymer extrusions 54 with a first profile or two second polymer extrusions 58 with a second profile. The first profile of the first polymer extrusion 54 is different from the second profile of the second polymer extrusion 58.

As shown in FIG. 8 the first seal system 44 located in the area of the top horizontal stile comprises two second polymer extrusions 58 with the same profile, but orientated to have a left-hand and a right-hand placement in the seal system. The second seal system 46 located in the area of the bottom horizontal stile may comprise two first polymer extrusions 54 with the same profile, but oriented to have a left-hand and a right-hand placement in the second seal system 46. The orientation of the first seal system 44 and the second seal system 46 are such that the engagement surfaces 48 of the first seal system 44 and the second seal system 46 engage to form a seal between the first overhead door panel 40 and an adjacent second overhead door panel 42. FIG. 8 also illustrates an example of the pivotal connection 38 discussed above.

Figure 6:
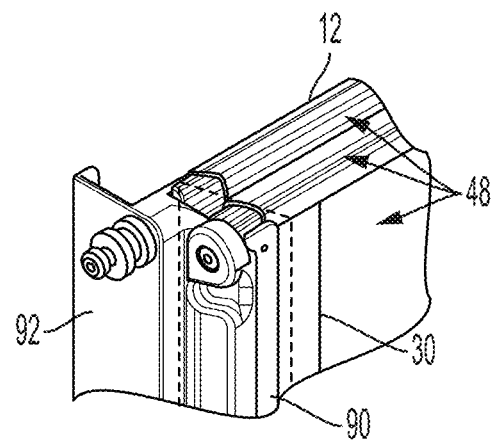
FIG. 6 is an isometric view of an example seal system of the present disclosure with a vapor permeable membrane in an internal structure.

FIG. 6 illustrates an example of the overhead door panel 12 with a vapor permeable membrane 90. The overhead door panel 12 may optionally comprise a vapor permeable membrane 90 in the area of the left vertical stile 30 or right vertical stile (not shown) to allow one-way moisture transportation out of the interior of the overhead door panel. The membrane 90 may be located adjacent to a vertical stile and may wrap the panel end before an endcap 92 would be fastened to the vertical stile. The membrane 90 is illustrated in FIG. 6 in dashed lines as the membrane 90 may not be visible when the endcap 92 is placed over the membrane 90 that is wrapped on the end of the vertical stile.

Suitable vapor permeable membrane materials include high-density polyethylene, stretched polytetrafluoroethylene laminate, and other materials which impart 'breathability' of the water vapors out of the interior cavity of the overhead door panel, but prevents water or dust from entering into the interior cavity of the overhead door panel. The membrane material should be selected such that water vapor transmission going in one direction through the material is greater than the water vapor transmission in the opposite direction of the same material.

In one embodiment, the glass sections 36 are essentially free of inert gases in the interior cavity of the overhead door panel. The glass sections 36 are essential free of desiccate fill in the interior cavity of the overhead door panel 12.

The overhead door panel 12 may optionally comprise a vent structure (not shown) that operates to allow venting from the internal structure of the overhead door panel 12 to the exterior environment. The vent may reduce internal pressures from solar pumping help reduce thermal bowing. The vent may be present as part of the left or right vertical stile. Additionally, the vent may reduce the moisture level in the interior of the overhead door panel 12.

A suitable overhead door structure for use with the present disclosure is a vertical stacking door panel design such as that discussed in U.S. Pat. No. 8,869,450, herein incorporated by reference. The overhead door comprises a plurality of unconnected door panels. The right and left vertical stiles comprise end caps. Furthermore, a door design discussed in either WO2019/204250 or U.S. Pat. No. 10,125,540, is herein incorporated by reference.

A suitable overhead door structure for use with the present disclosure is a traditional overhead hinged door structure. Such a system comprises a plurality of door sections connected by hinges. The overhead door utilizes a counterbalance system to assist in movement of the overhead door to and between the downward closed and upward open positions. The counterbalance system comprises a shaft extended between opposite cable drums, a torsion spring mounted on the shaft, and cables extending from the cable drums to the bottom edge of the lowest door panel of the overhead door. The counterbalance system may be operated directly or indirectly by a motor. The motor rotationally turns the shaft and drums, which moves the cables in a vertical direction. The counterbalance system further comprises a cable tension device.

The overhead door is movable between a downward closed position and an upward open position along a door track system which includes a pair of vertical track sections, a pair of horizontal track sections, and a pair of transition track sections, all spaced on opposite ends of the overhead door as is known in the art. The track system is stabilized by a track system bracket to the wall about the door opening. Hinges may be mounted on the door sections on the ends of the sections and at one or more internal points on the door sections. Each hinge that is located on the ends of the sections includes a roller mounted on a roller shaft generally aligned with a pivot axis of the hinge. The rollers are captured within the track system.

The overhead door sections may be constructed of the same materials or different materials. The frame structure of the door section may comprise at least two vertical stiles and at least two horizontal stiles that are connected to form right angles and a rectangle. The frame structure may further comprise a third vertical stile, a fourth vertical stile, a fifth vertical stile, and a sixth vertical stile forming multiple middle areas defined by the frame structure. The middle areas of the frame structure can be open, the middle areas may comprise a solid metal panel, the middle areas may comprise an open metal structure (e.g., screen, grid, grate, woven metal structure), the middle areas may comprise a glass panel that is clear or translucent, the glass panel may comprise a laminate structure that is intended to have impact resistance such as those discussed in US Patent Application 2004/0172882 (paragraphs [0045]-[0047], WO2017/136327A1, U.S. Pat. Nos. 7,296,608, 8,733,024, and 4,294,055, all of which are incorporated by reference. The glass panel may also comprise the glass panels discussed herein.

The first seal system 44 and the second seal system 46 may be applied to windows that are not door sections. In one embodiment, a window comprising a pair of glass panes, a metal frame section, a first seal system, and a second seal system, wherein the first and second seal systems engage with at least one glass pane of the pair of glass panes and the metal frame such that the one glass pane is spatially distanced from the metal frame section.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An overhead door panel, comprising:
   a first glass pane;
   a second glass pane;
   a first seal system, comprising:
      a first metal frame section;
      a first polymer extrusion coupled to the first glass pane and the first metal frame; and
      a second polymer extrusion coupled to the second glass pane and the first metal frame; and
   a second seal system, comprising:
      a second metal frame section;
      a third polymer extrusion coupled to the first glass pane and the second metal frame; and
      a fourth polymer extrusion coupled to the second glass pane and the second metal frame,
   wherein the first seal system and the second seal system each provide an engagement surface for a respective adjacent overhead panel;
   wherein the first glass pane, the second glass pane, the first seal system, and the second seal system form an interior cavity that is essentially free of inert gases and desiccate fill.

2. The overhead door panel of claim 1, further comprising:
   a vapor permeable membrane located adjacent to the first metal frame section or the second metal frame section.

3. The overhead door panel of claim 2, wherein the vapor permeable membrane wraps an end of the overhead door panel before an endcap is fastened to the end of the overhead door panel.

4. The overhead door panel of claim 2, wherein a material for the vapor permeable membrane is selected such that a water vapor transmission going in one direction through the material is greater than the water vapor transmission going in an opposite direction through the material.

5. The overhead door panel of claim 4, wherein the material is selected from a group consisting of: high-density polyethylene or stretched polytetrafluoroethylene laminate.

6. The overhead door panel of claim 1, wherein the first metal frame section comprises:
   a first engagement structure;
   a second engagement structure; and
   a third engagement structure.

7. The overhead door panel of claim 6, wherein the first polymer extrusion is coupled to the first engagement structure and the third engagement structure and the second polymer extrusion is coupled to the second engagement structure and the third engagement structure.

8. The overhead door panel of claim 1, wherein the second metal frame section comprises:
   a first engagement structure;
   a second engagement structure; and
   a third engagement structure.

9. The overhead door panel of claim 8, wherein the third polymer extrusion is coupled to the first engagement structure and the third engagement structure and the fourth polymer extrusion is coupled to the second engagement structure and the third engagement structure.

10. An overhead door panel, comprising:
    a first glass pane;
    a second glass pane; and a first seal system formed by a first polymer extrusion coupled to the first glass pane, a second polymer extrusion coupled to the second glass pane, and a central extrusion that spatially separates the first glass pane and the second glass pane to form an interior cavity between the first glass pane and the second glass pane that is free of inert gases and desiccate fill, wherein the first seal system provides an engagement surface for an adjacent overhead panel.

11. The overhead door panel of claim 10, further comprising:
a second seal system located on a second lateral stile opposite a first lateral stile where the first seal system is located, wherein the second seal system is coupled to the first glass pane and the second glass pane to enclose the interior cavity.

12. The overhead door panel of claim 11, wherein the second seal system comprises a second central extrusion, a third polymer extrusion connected to the first glass pane and the second central extrusion, and a fourth polymer extrusion connected to the second glass pane and the second central extrusion.

13. The overhead door panel of claim 10, further comprising:
a vapor permeable membrane located adjacent to a vertical stile of the overhead door panel.

14. The overhead door panel of claim 13, wherein a material for the vapor permeable membrane is selected such that a water vapor transmission going in one direction through the material is greater than the water vapor transmission going in an opposite direction through the material.

15. The overhead door panel of claim 14, wherein the material is selected from a group comprising of: high-density polyethylene or stretched polytetrafluoroethylene laminate.

16. The overhead door panel of claim 13, further comprising:
an endcap coupled to the vertical stile and over the vapor permeable membrane.

17. An insulated window, comprising:
a first glass pane;
a second glass pane;
a metal frame section oriented perpendicular to the first glass pane and the second glass pane, the metal frame comprising:
a first ledge structure;
a second ledge structure; and
a third engagement structure, wherein the third engagement structure of the metal frame comprises:
a first distanced extension member having a first lip; and
a second distanced extension member having a second lip, wherein an opening between the first lip and the second lip is smaller than a distance between the first distanced extension member and the second distanced extension member below the first lip and the second lip;
a first polymer extrusion comprising a first glass run channel that engages with the first glass pane, wherein the first polymer extrusion is coupled to the first ledge structure and the third engagement structure of the metal frame section to form a first seal between the first glass pane and the first polymer extrusion; and
a second polymer extrusion comprising a second glass run channel that engages with the second glass pane, wherein the second polymer extrusion is coupled to the second ledge structure and the third engagement structure of the metal frame to form a second seal between the second glass pane and the second polymer extrusion.

18. The insulated window of claim 17, further comprising:
a second metal frame section oriented perpendicular to the first glass pane and the second glass pane, the metal frame comprising:
a respective first ledge structure;
a respective second ledge structure; and
a respective third engagement structure;
a third polymer extrusion comprising a third glass run channel that engages with the first glass pane on an end of the first glass pane that is opposite from first polymer extrusion, wherein the third polymer extrusion is coupled to the respective first ledge structure and the respective third engagement structure of the second metal frame section to form a third seal between the first glass pane and the third polymer extrusion; and
a fourth polymer extrusion comprising a fourth glass run channel that engages with the second glass pane on an end of the second glass pane that is opposite from the second polymer extrusion, wherein the fourth polymer extrusion is coupled to the respective second ledge structure and the respective third engagement structure of the second metal frame to form a fourth seal between the second glass pane and the fourth polymer extrusion.

19. The insulated window of claim 17, wherein the first ledge structure is coupled to the first polymer extrusion below the first glass run channel and the second ledge structure is coupled to the second polymer extrusion below the second glass run channel.

* * * * *